United States Patent
Katz (10) Patent No.: US 7,145,878 B2
(45) Date of Patent: Dec. 5, 2006

(54) AVOIDING OVERLAPPING SEGMENTS IN TRANSPARENT LAN SERVICES ON RING-BASED NETWORKS

(75) Inventor: Shachar Katz, Raanana (IL)

(73) Assignee: Corrigent Systems Ltd., Tel Aviv (IL)

( * ) Notice: Subject to any disclaimer, the term of this patent is extended or adjusted under 35 U.S.C. 154(b) by 968 days.

(21) Appl. No.: 10/054,845

(22) Filed: Jan. 25, 2002

(65) Prior Publication Data
US 2003/0026209 A1 Feb. 6, 2003

Related U.S. Application Data

(60) Provisional application No. 60/308,410, filed on Jul. 27, 2001.

(51) Int. Cl.
*H04L 12/26* (2006.01)
(52) U.S. Cl. .................. 370/238; 370/235; 370/254; 709/241
(58) Field of Classification Search ................ 370/238, 370/281, 235, 216, 254–256, 401–405, 222; 709/239, 241
See application file for complete search history.

(56) References Cited

U.S. PATENT DOCUMENTS

| | | | |
|---|---|---|---|
| 5,461,611 A | 10/1995 | Drake, Jr. et al. | |
| 5,581,703 A | 12/1996 | Baugher et al. | |
| 5,706,516 A | 1/1998 | Chang et al. | |
| 5,983,360 A | 11/1999 | Ugajin | |
| 6,032,194 A | 2/2000 | Gai et al. | |
| 6,205,488 B1 | 3/2001 | Casey et al. | |
| 6,256,292 B1 | 7/2001 | Ellis et al. | |
| 6,262,976 B1 | 7/2001 | McNamara | |
| 6,304,575 B1 | 10/2001 | Carroll et al. | |
| 6,314,110 B1 | 11/2001 | Chin et al. | |
| 6,330,229 B1 | 12/2001 | Jain et al. | |
| 6,339,488 B1 | 1/2002 | Beshai et al. | |
| 6,339,595 B1 | 1/2002 | Rekhter et al. | |
| 6,370,121 B1 * | 4/2002 | Hausman .................. 370/256 |
| 6,442,134 B1 | 8/2002 | Mitchell | |
| 6,446,131 B1 | 9/2002 | Khansari et al. | |
| 6,456,407 B1 | 9/2002 | Tammela et al. | |

(Continued)

OTHER PUBLICATIONS

A. Herrera, et al., Lantern Communications, Network Working Group, Internet Draft, pp. 1-16, "A Framework for IP Over Resilient Packet Rings", Jun. 2001 (p. 2 will be filed later).

(Continued)

*Primary Examiner*—Ricky Q. Ngo
*Assistant Examiner*—Nguyen Ngo
(74) *Attorney, Agent, or Firm*—Oblon, Spivak, McClelland, Maier & Neustadt, P.C.

(57) ABSTRACT

A method for eliminating loops in a communication network in which the nodes operate as virtual bridges, having virtual ports that link the virtual bridges over virtual connections, each of the virtual connections coinciding respectively with one or more segments of the network. Respective port costs are assigned to the virtual ports responsive to a count of the network segments with which the respective virtual connections coincide, so as to favor virtual paths between pairs of the nodes that are made up of a greater number of the virtual connections, relative to the virtual paths that are made up of a lesser number of the virtual connections. Respective path costs are computed for the virtual paths, based on the port costs, and the virtual connections over which to send traffic between the virtual bridges are selected responsive to the path costs.

36 Claims, 2 Drawing Sheets

U.S. PATENT DOCUMENTS

| | | | |
|---|---|---|---|
| 6,466,985 B1 | 10/2002 | Goyal et al. | |
| 6,628,624 B1 | 9/2003 | Mahajan et al. | |
| 6,639,893 B1 | 10/2003 | Chikenji et al. | |
| 6,639,896 B1 | 10/2003 | Goode et al. | |
| 6,678,241 B1 * | 1/2004 | Gai et al. | 370/216 |
| 6,680,912 B1 | 1/2004 | Kalman et al. | |
| 6,711,125 B1 | 3/2004 | Walrand et al. | |
| 6,731,597 B1 | 5/2004 | Batchellor et al. | |
| 6,757,286 B1 * | 6/2004 | Stone | 370/395.53 |
| 6,765,881 B1 * | 7/2004 | Rajakarunanayake | 370/256 |
| 6,765,921 B1 | 7/2004 | Stacey et al. | |
| 6,795,394 B1 | 9/2004 | Swinkels et al. | |
| 6,801,506 B1 * | 10/2004 | Dey | 370/256 |
| 6,820,210 B1 | 11/2004 | Daruwalla et al. | |
| 6,826,158 B1 * | 11/2004 | Seaman et al. | 370/254 |
| 6,879,594 B1 | 4/2005 | Lee et al. | |
| 6,922,394 B1 * | 7/2005 | Kajiwara | 370/238 |
| 6,934,259 B1 * | 8/2005 | Klincewicz et al. | 370/238 |
| 2001/0022786 A1 | 9/2001 | King et al. | |
| 2003/0002443 A1 * | 1/2003 | Basso et al. | 370/237 |
| 2004/0071089 A1 * | 4/2004 | Bauer et al. | 370/238 |
| 2004/0202171 A1 | 10/2004 | Hama | |

OTHER PUBLICATIONS

P. Jogalekar, et al., Luminous Networks, Inc., Network Working Group, Internet Draft, pp. 1-16 "IP Over Resilient Packet Rings", Nov. 2000.

M. Lasserre, et al., Riverstone Networks, Internet Draft, Internet Draft, pp. 1-11, "Transparent VLAN Services Over MPLS", Aug. 2001.

E. Rosen, et al., Cisco Systems, Inc., Network Working Group, pp. 1-55, "Multiprotocol Label Switching Architecture", Jan. 2001.

T. Senevirathne, Force10, Network Working Group, Internet Draft, pp. 1-9, "Use of Partial Meshed Tunnels to Achieve Forwarding Behavior of Full Meshed Tunnels" Jun. 2001.

D. Tsiang, et al., Cisco Systems, Network Working Group, pp. 1-47, "The Cisco SRP Mac Layer Protocol", Aug. 2000.

ISO/IEC 15802-3: 1998, ANSI/IEEE Std 802. 1D, 1998 Edition, pp. 29-109, "Information Technology—Telecommunications and Information Exchange Between Systems—Local and Metropolitan Area Networks—Common Specification—Part 3: Media Access Control (MAC) Bridges", 1998.

* cited by examiner

AVOIDING OVERLAPPING SEGMENTS IN TRANSPARENT LAN SERVICES ON RING-BASED NETWORKS

CROSS-REFERENCE TO RELATED APPLICATIONS

This application claims the benefit of U.S. Provisional Patent Application No. 60/308,410, filed Jul. 27, 2001, which is incorporated herein by reference.

FIELD OF THE INVENTION

The present invention relates generally to communication networks, and specifically to methods and systems for providing transparent LAN services over a network using label switching.

BACKGROUND OF THE INVENTION

Local Area Networks (LANs) connect computing systems together. LANs of all types can be connected together using Media Access Control (MAC) bridges, as set forth in the "IEEE Standard for Information Technology, Telecommunications and Information Exchange between Systems, Local and Metropolitan Area Networks, Common Specifications, Part 3: Media Access Control (MAC) Bridges," published as ANSI/IEEE Standard 802.1D (1998), which is incorporated herein by reference. The 802.1D standard is available at standards.ieee.org/catalog/IEEE802.1.html.

Each computing system connects to a LAN through a MAC device. MAC bridges that implement the 802.1D standard allow MAC devices attached to separate LANs to appear to each other as if they were attached to a single LAN. A MAC bridge functions within the Logical Link Control (LLC) sublayer of the Network Layer defined in ISO/IEC standard 7498-1: 1994, entitled "Information Processing Systems—Open Systems Interconnection-Basic Reference Model—Part 1: The Basic Model" (available from the American National Standards Institute, New York, N.Y.), which is incorporated herein by reference. The bridge includes two or more MAC devices that interconnect the bridge ports to respective LANs.

MAC bridges utilize a database to map destination MAC addresses located in the packets to bridge ports. The bridge builds the database by means of a learning process, in which it associates the source MAC address of each incoming packet with the port on which the packet was received. When the bridge receives an incoming packet whose destination address is not located in the database, it broadcasts the packet on all its available ports, except the one the packet arrived on. MAC bridges that do not recognize the destination address will further broadcast the packet. Through the broadcast mechanism, the packet will eventually traverse all interconnected bridges at least once.

Loops in the network topology can cause these broadcast packets to flood the network. If the packet's destination address is not recognized at any point in the loop, the packet may continue to traverse the loop forever. The topology of bridge interconnections must be managed to prevent packets traveling in loops between bridges that propagate the broadcast packet. For this purpose, the IEEE 802.1D standard specifies an implementation of a spanning tree protocol (STP) and algorithm, for managing the creation and updating of the network topology. STP ensures that all data paths in a network of bridges are free of loops by disabling forwarding of packets through certain interfaces. The spanning tree algorithm and protocol thus configure a simply-connected active topology from the arbitrarily-connected components of the network. The spanning tree algorithm takes advantage of a standard feature of MAC ports: the ports may be either in a blocking state or a forwarding state. Frames are forwarded through ports in a MAC bridge in the forwarding state, and not through ports in the blocking state. At any time, bridges effectively connect just the LANs to which ports in a forwarding state are attached. Ports that are in a blocking state do not forward frames.

The spanning tree algorithm defines one bridge in the network as the root bridge. Each LAN connected to the network has a bridge port that connects it to the root bridge. This port is known as the designated port for the LAN, and the bridge of which the designated port is part is known as the designated bridge for the LAN. The root bridge is the designated bridge for each LAN to which it is connected. Each bridge has a port defined as the root port, which uniquely connects the bridge to the root bridge. All ports on the bridge that are neither the root port nor the designated port are put into the blocking state.

In determining which port should be used as the root port, STP defines a path cost associated with each path out of the ports in a bridge. The sum of the active path costs from a designated bridge port to the root bridge is defined as the root path cost. STP also defines a priority for each port on each bridge. In its simplest form, the port priority is the numerical value of the port identifier. If there is more than one possible path from a designated bridge port to the root bridge, STP specifies that the path with the lowest cost will be chosen. Frames destined to cross the network will travel from the originating LAN's designated bridge along a root path toward the root bridge. If the destination bridge does not lie along the root path, the frame will be routed through the root bridge and travel along a root path from the root bridge to the designated port for the destination LAN.

STP defines a method of communicating the information necessary for computing root paths in a network. MAC bridges that conform to the IEEE 802.1D standard transmit control information using bridge protocol data units (BPDUs). A MAC frame conveying a BPDU is received by all the bridges connected to the LAN on which the frame is transmitted. BPDUs are not directly forwarded by bridges, but the information in them may be used by a bridge in calculating its own BPDU to transmit, and may stimulate that transmission. STP uses configuration BPDUs to determine the network topology, as is laid out in the IEEE 802.1D standard (section 8.3.2):

"Each configuration BPDU contains, among other parameters, the unique identifier of the bridge that the transmitting bridge believes to be the root, the cost of the path to the root from the transmitting port, the identifier of the transmitting bridge, and the identifier of the transmitting port. This information is sufficient to allow a receiving bridge to determine whether the transmitting port has a better claim to be the designated port on the LAN on which the configuration BPDU was received than the port currently believed to be the designated port, and to determine whether the receiving port should become the root port for the bridge if it is not already.

"Timely propagation throughout the bridged LAN of the necessary information to allow all bridge ports to determine their state (blocking or forwarding) is achieved through three basic mechanisms:

"a) A bridge that believes itself to be the root (all bridges start by believing themselves to be the root until they discover otherwise) originates configuration messages (by transmitting configuration BPDUs) on all the LANs to which it is attached, at regular intervals.

"b) A bridge that receives a configuration BPDU on what it decides is its root port conveying better information (i.e., highest priority root identifier, lowest root path cost, highest priority transmitting bridge and port), passes that information on to all the LANs for which it believes itself to be the designated bridge.

"c) A bridge that receives inferior information, on a port it considers to be the designated port on the LAN to which it is attached, transmits its own information in reply, for all other bridges attached to that LAN to hear.

"Hence, spanning tree paths to the bridge with highest priority root identifier are quickly learned throughout the bridged LAN, with inferior information about other potential roots and paths being contradicted."

STP is guaranteed to converge within a finite period of time to a network topology with no loops, given an arbitrary initial topology. Note that the description of STP in the IEEE 802.1D standard does not specify a method for calculating the cost of the path to the root from the transmitting port. While STP is guaranteed to converge, the path costs will determine the optimality of the solution obtained.

Multiprotocol Label Switching (MPLS) is gaining popularity as a method for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. This RFC is available at www.ietf.org/rfc.html. In conventional connectionless packet routing, each router along the path of a packet sent through the network analyzes the packet header and independently chooses the next hop for the packet by running a routing algorithm. In MPLS, however, each packet is assigned to a Forwarding Equivalence Class (FEC) when it enters the network, depending on its destination address. A short, fixed-length label identifying the FEC to which the packet belongs is pushed onto the top of a label stack, which is attached to the packet at the FEC ingress point. All packets in a given FEC are passed through the network over the same path by label-switching routers (LSRs). Unlike IP routers, LSRs simply use the packet label as an index to a look-up table, which specifies the next hop on the path for each FEC and the label that the LSR should attach to the packet for the next hop. The LSR pops the top label off the label stack, examines its destination address, and pushes another label onto the stack with the destination of the next hop.

The flow of packets along a label-switched path (LSP) under MPLS is completely specified by the label applied at the ingress of the path. A LSP is essentially a tunnel through the network, useful in network traffic management and communication security. MPLS tunnels are established by "binding" a particular label, assigned at the ingress node to the network, to a particular FEC.

Lasserre et al. describe a method to create a virtual LAN using a MPLS network in "Transparent VLAN services over MPLS" (July 2001), which is incorporated herein by reference. This document is available at search.ietf.org/internet-drafts/draft-lasserre-tls-mpls-0.txt. A transparent LAN service (TLS) provides bridge-like functionality between multiple sites over a large network. Users connect to the TLS via regular node interfaces, and LSPs between the nodes to which the users are connected form the TLS entity itself.

Every node in a TLS acts as a virtual bridge. A virtual bridge node has "virtual ports," which are the endpoints of LSPs that are part of the TLS. The interfaces to which the users are actually connected are "real" ports. Both virtual and real interfaces are treated identically from the point of view of bridge processing (frame forwarding policies and loop prevention). A single LSP can participate in multiple TLS instances, each belonging to a different user.

The TLS network topology is completely specified by the LSP connections, which in turn depend on the MPLS protocol to actually transfer the packets through the virtual tunnels. Since MPLS networks supply an alternative, virtual implementation of layer 2 network communications, TLS can be thought of as parallel to conventional virtual bridged local area networks, as specified in the IEEE 802.1Q standard. From the perspective of the end user, a TLS network is transparent. The user is provided with the illusion that the LSPs are single-hop connections between adjacent routers.

TLS networks are still in the development stage, and there are as yet no clear standards for loop prevention in such networks. One possible solution to removing loops in TLS topologies is to configure the TLS network as a full mesh of tunnels, as suggested by Lasserre et al. in the above-mentioned draft, but the full-mesh topology is costly and difficult to maintain. Therefore, a preferred solution is to run STP on the TLS network, as described, for example, by Senevirathne in "Use of Partial Meshed Tunnels to Achieve Forwarding Behavior of Full Meshed Tunnels" (June 2001), which is incorporated herein by reference. This document is available at search.ietf. org/internet-drafts/draft-tsenevir-l2vpn-pmesh-00.txt. Senevirathne describes a method of separating STP into user and provider spaces. STP information is carried across the provider space in the network using extensions to the Border Gateway Protocol (BGP) and the Open Shortest Path First (OSPF) protocol.

Network ring topologies are well known in the art of synchronous networks (such as SONET) and are being increasingly used in Internet Protocol (IP) networks, as well. Ring networks enable carriers to offer large bandwidth to users in a cost-effective manner. They also lend themselves to fast rerouting in the event of network failures, since two alternative routes—in clockwise and counterclockwise directions—are generally available for connecting any two nodes on the ring. Some recently-developed bidirectional protocols provide efficient bandwidth utilization by enabling data to be transferred between any pair of nodes in either direction around the ring, while maintaining fast protection against faults.

The leading bidirectional protocol for high-speed packet rings is the Resilient Packet Rings (RPR) protocol, which is in the process of being defined as IEEE standard 802.17. Network-layer routing over RPR is described, for example, by Jogalekar et al., in "IP over Resilient Packet Rings" (Internet Draft draft-jogalekar-iporpr-00), and by Herrera et al., in "A Framework for IP over Packet Transport Rings" (Internet Draft draft-ietf-ipoptr-framework-00). A proposed solution for Media Access Control (MAC—protocol layer 2) in bidirectional ring networks is the Spatial Reuse Protocol (SRP), which is described by Tsiang et al., in Request for Comments (RFC) 2892 of the Internet Engineering Task Force (IETF). All these documents are incorporated herein by reference. They are available at www.ietf.org.

SUMMARY OF THE INVENTION

It is an object of some aspects of the present invention to provide improved methods for carrying out a Spanning Tree Protocol (STP) over a system of label-switched paths (LSPs) in a communication network, and to provide network devices that implement such methods.

It is a further object of some aspects of the present invention to provide methods and devices for implementing a Transparent LAN Service (TLS) in a ring network.

In the TLS environment, as noted above, each TLS node is treated as a virtual bridge, while each tunnel is seen as a LAN connection between the virtual ports of the nodes at the ends of the tunnel. The TLS is typically indifferent to the underlying nature of the tunnels, including the actual physical paths that the tunnels traverse. In a ring network particularly, a virtual connection between two of the TLS nodes at opposite sides of the ring may actually pass through one or more intermediate nodes on the way. It may thus physically overlap other virtual connections of the same TLS.

Conventionally, when STP runs on the TLS system, it sees each of the virtual connections between pairs of TLS nodes as a direct connection between the corresponding virtual ports. It is indifferent to the number of intermediate nodes that the virtual connections may cross and to the possible overlap between the physical paths taken by the different virtual connections. Therefore, STP may prune the TLS connections (particularly in a ring network) in such a way that the paths that are left in the resultant spanning tree include overlapping segments. Although this result is acceptable from the point of view of STP itself, the overlapping segments complicate traffic management in the ring network and can lead to suboptimal use of available network bandwidth. Preferred embodiments of the present invention therefore provide methods for removing paths with overlapping segments from the network of virtual connections.

In some preferred embodiments of the present invention, a novel method is used for calculation of port costs for virtual connections in a TLS system. When these costs are used by STP in its calculation of path costs, they cause STP to favor paths that do not overlap other virtual connections. As a result, the spanning tree that is generated within a ring network will consist mainly or entirely of simple paths, connecting mutually-adjacent TLS nodes in the network, while overlapping paths are largely or totally eliminated.

There is therefore provided, in accordance with a preferred embodiment of the present invention, a method for eliminating loops in a communication network, which includes nodes mutually connected by network segments, the method including:

configuring the nodes to operate as virtual bridges, having virtual ports that link the virtual bridges one to another over respective virtual connections, each of the virtual connections coinciding respectively with one or more of the network segments;

assigning to the virtual ports respective port costs that are responsive to a count of the network segments with which the respective virtual connections coincide, so as to favor virtual paths between pairs of the nodes that are made up of a greater number of the virtual connections, relative to the virtual paths that are made up of a lesser number of the virtual connections;

computing respective path costs for the virtual paths, based on the port costs; and selecting the virtual connections over which to send traffic between the virtual bridges responsive to the path costs.

Typically, the nodes and segments are configured in a ring topology, and selecting the virtual connections includes selecting the virtual connections so that the virtual connections over which the traffic is sent define simple paths conforming to the ring topology.

Preferably, selecting the virtual connections includes blocking one or more of the virtual connections so that for each of the network segments, there is only a single one of the virtual connections coinciding with it over which the traffic is sent. Most preferably, blocking the one or more of the virtual connections includes, when a first virtual connection between a first virtual bridge and a second virtual bridge overlaps a sequence of two or more virtual connections between the first virtual bridge, one or more intermediate virtual bridges, and the second virtual bridge, blocking the first virtual connection.

In a preferred embodiment, configuring the nodes includes configuring the virtual bridges to convey the traffic therebetween using a label-switching protocol. Preferably, configuring the virtual bridges includes arranging the virtual bridges to provide a transparent local area network service (TLS) using the label-switching protocol. Most preferably, selecting the virtual connections includes running a spanning tree protocol (STP) on the TLS.

In a preferred embodiment, assigning the respective port costs includes setting each of the port costs equal to a first constant times the count of the network segments with which the respective virtual connections coincide, less a second constant. Preferably, computing the respective path costs includes summing the port costs of the virtual connections making up the virtual paths, so that each of the path costs is equal to the first constant times the count of the network segments with which the respective virtual connections making up the virtual paths coincide, less the second constant times the number of the virtual connections making up the virtual paths.

There is also provided, in accordance with a preferred embodiment of the present invention, a method for eliminating overlap in a communication network, which includes nodes mutually connected by network segments, the method including:

configuring the nodes to operate as virtual bridges having virtual ports that link the virtual bridges one to another over respective virtual connections, each of the virtual connections coinciding respectively with one or more of the network segments;

selecting the virtual connections over which to send traffic between the virtual bridges such that when a first virtual connection between a first virtual bridge and a second virtual bridge overlaps a sequence of two or more other virtual connections between the first virtual bridge, one or more intermediate virtual bridges, and the second virtual bridge, the first virtual connection is blocked, and the traffic is sent over the sequence of virtual connections.

There is additionally provided, in accordance with a preferred embodiment of the present invention, a device for operation as one of a plurality of nodes in a communication network, in which the nodes are mutually connected by network segments, the device including:

one or more ports, adapted to send and receive traffic through the communication network; and a traffic processor, configured to process the traffic so that the device operates as a virtual bridge, having virtual ports that link the device to other virtual bridges in the network over respective virtual connections, each of the virtual connections coinciding respectively with one or more of the network segments, wherein the traffic processor is adapted to assign to the virtual ports respective port costs that are responsive to a count of the network segments with which the respective virtual connections coincide, so as to favor virtual paths between pairs of the nodes that are made up of a greater number of the virtual connections, relative to the virtual paths that are made up of a lesser number of the virtual connections, to compute respective path costs for the virtual paths, based on the port costs, and to select the virtual connections over which to send the traffic between the virtual bridges responsive to the path costs.

There is further provided, in accordance with a preferred embodiment of the present invention, a device for operation as one of a plurality of nodes in a communication network, in which the nodes are mutually connected by network segments, the device including:

one or more ports, adapted to send and receive traffic through the communication network; and a traffic processor, configured to process the traffic so that the device operates as a virtual bridge, having virtual ports that link the device to other virtual bridges in the network over respective virtual connections, each of the virtual connections coinciding respectively with one or more of the network segments, wherein the traffic processor is adapted to select the virtual connections over which to send traffic between the virtual bridges such that when a first virtual connection between a first virtual bridge and a second virtual bridge overlaps a sequence of two or more other virtual connections between the first virtual bridge, one or more intermediate virtual bridges, and the second virtual bridge, the first virtual connection is blocked, and the traffic is sent over the sequence of virtual connections.

There is moreover provided, in accordance with a preferred embodiment of the present invention, a communication network including a plurality of nodes and network segments connecting the nodes in a ring topology, wherein the nodes are adapted to send and receive traffic over the segments and to process the traffic so as to operate as virtual bridges, having virtual ports that link each of the nodes to other virtual bridges in the network over respective virtual connections, each of the virtual connections coinciding respectively with one or more of the network segments, and wherein the nodes are further adapted to assign to the virtual ports respective port costs that are responsive to a count of the network segments with which the respective virtual connections coincide, so as to favor virtual paths between pairs of the nodes that are made up of a greater number of the virtual connections, relative to the virtual paths that are made up of a lesser number of the virtual connections, and to compute respective path costs for the virtual paths, based on the port costs, and to select the virtual connections over which to send the traffic between the virtual bridges responsive to the path costs.

There is furthermore provided, in accordance with a preferred embodiment of the present invention, a communication network including a plurality of nodes and network segments connecting the nodes in a ring topology, wherein the nodes are adapted to send and receive traffic over the segments and to process the traffic so as to operate as virtual bridges, having virtual ports that link each of the nodes to other virtual bridges in the network over respective virtual connections, each of the virtual connections coinciding respectively with one or more of the network segments, and wherein the nodes are further adapted to select the virtual connections over which to send traffic between the virtual bridges such that when a first virtual connection between a first virtual bridge and a second virtual bridge overlaps a sequence of two or more other virtual connections between the first virtual bridge, one or more intermediate virtual bridges, and the second virtual bridge, the first virtual connection is blocked, and the traffic is sent over the sequence of virtual connections.

The present invention will be more fully understood from the following detailed description of the preferred embodiments thereof, taken together with the drawings in which:

DETAILED DESCRIPTION OF PREFERRED EMBODIMENTS

Figure 1:
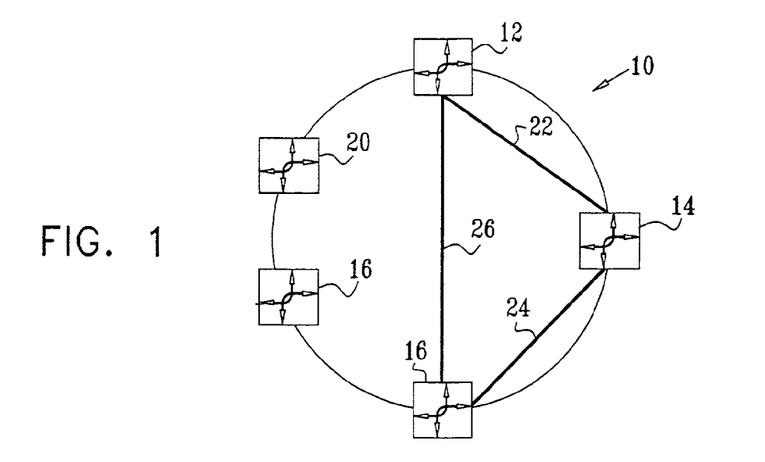
FIG. 1 is a block diagram that schematically illustrates a ring network configured for Transparent LAN Service (TLS), in accordance with a preferred embodiment of the present invention.

FIG. 1 is a block diagram that schematically illustrates a ring network 10 configured for Transparent LAN Service (TLS), in accordance with a preferred embodiment of the present invention. Network 10 comprises nodes 12, 14, 16, 18, and 20, which are configured to serve as label-switched routers (LSRs), preferably using Multi-Protocol Label Switching (MPLS), as described in the Background of the Invention. Network 10 is enhanced so as to enable the nodes to calculate port and root path costs for STP in a novel way, as described below.

A point-to-point transparent LAN service (TLS) connects nodes 12, 14 and 16 across label-switched paths (LSPs) 22, 24 and 26. The virtual connections over paths 22 and 24 correspond respectively to the physical segments of network 10 between nodes 12 and 14 and between nodes 14 and 16, and the nodes themselves serve as virtual bridges in the TLS. There is no single segment of network 10 corresponding to LSP 26, however, and the direct path between nodes 12 and 16 exists only virtually. Physically, packets traveling between node 16 and node 12 must travel through node 14 in order to reach their destination. Thus, in the physical plane, LSP 26 overlaps LSPs 22 and 24. (Alternatively, in a bidirectional ring, LSP 26 could physically pass through nodes 18 and 20, in which case it would likely overlap other LSPs, not shown in the figure.) As configured in FIG. 1, LSPs 22, 24 and 26 form a loop in the TLS.

Figure 2A:
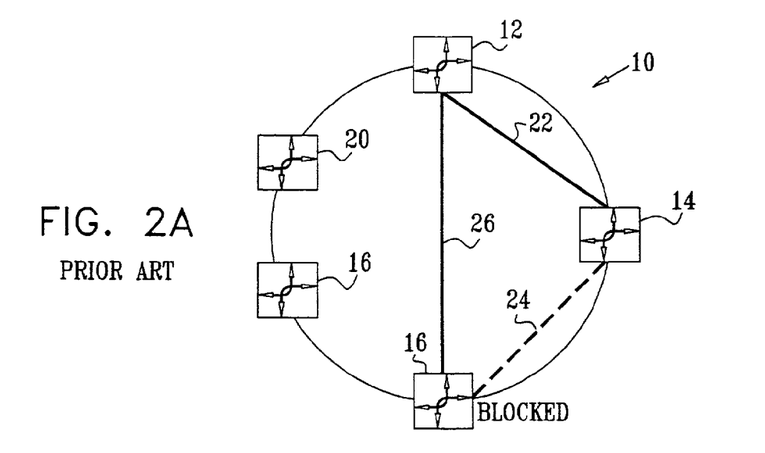
FIG. 2A and FIG. 2B are block diagrams that schematically illustrate two alternative spanning trees in the network of FIG. 1.

FIG. 2A is a block diagram that schematically illustrates one solution for removing the loop from the TLS, by blocking LSP 24. The illustrated solution is valid from the viewpoint of removing loops from the TLS network and may actually be preferred by STP, since it connects both of nodes 14 and 16 by a single virtual hop to node 12. Physically, the alternative virtual paths from node 16 to node 12 (directly via LSP 26 or in via LSPs 24 and 22 in sequence) are of equal length, so that there is no inherent reason for STP to reject LSP 26.

In the configuration of FIG. 2A, however, data frames originating at node 16 and destined for node 14 are routed across LSP 26 to node 12, and then back over LSP 22 to node 14. In other words, instead of traveling directly from node 16 to node 14 in a single physical hop over the segment of network 10 between them, each frame from node 16 must also cross the network segment between node 12 and node 14 twice. Needless to say, this configuration can be very wasteful of network resources.

Figure 2B:
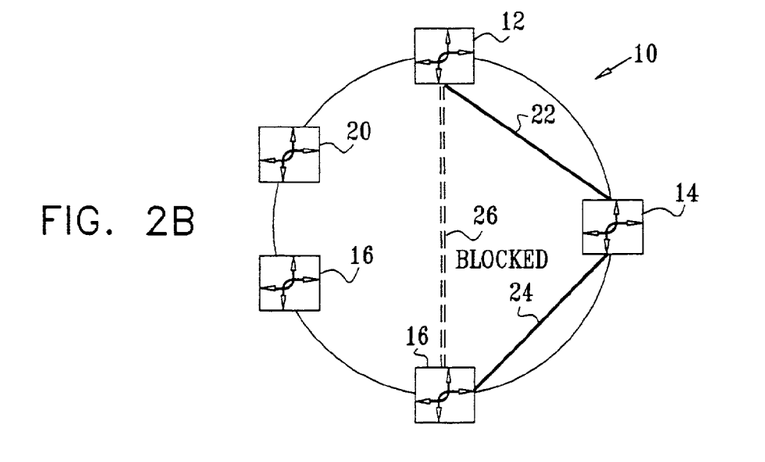

FIG. 2B is a block diagram that schematically illustrates a more efficient solution to removing the loop from the TLS in network 10, in accordance with a preferred embodiment of the present invention. In this case, LSP 26 is blocked. Frames originating at node 16 and destined for node 14 are routed across LSP 24, which comprises a single network segment between the nodes. Frames originating at node 16 and destined for node 12 are routed over LSP 24 and LSP 22. Although this path appears to be longer than LSP 26 in the virtual world of the TLS, it is physically the same length as LSP 26. This example makes it clear that STP in network 10 should generally be configured so as to favor simple paths, i.e., LSPs that connect adjacent TLS nodes without physically overlapping other LSPs. In the preferred embodiment described below, this object is achieved by manipulating the virtual port costs assigned at the nodes participating in the TLS.

Figure 3:
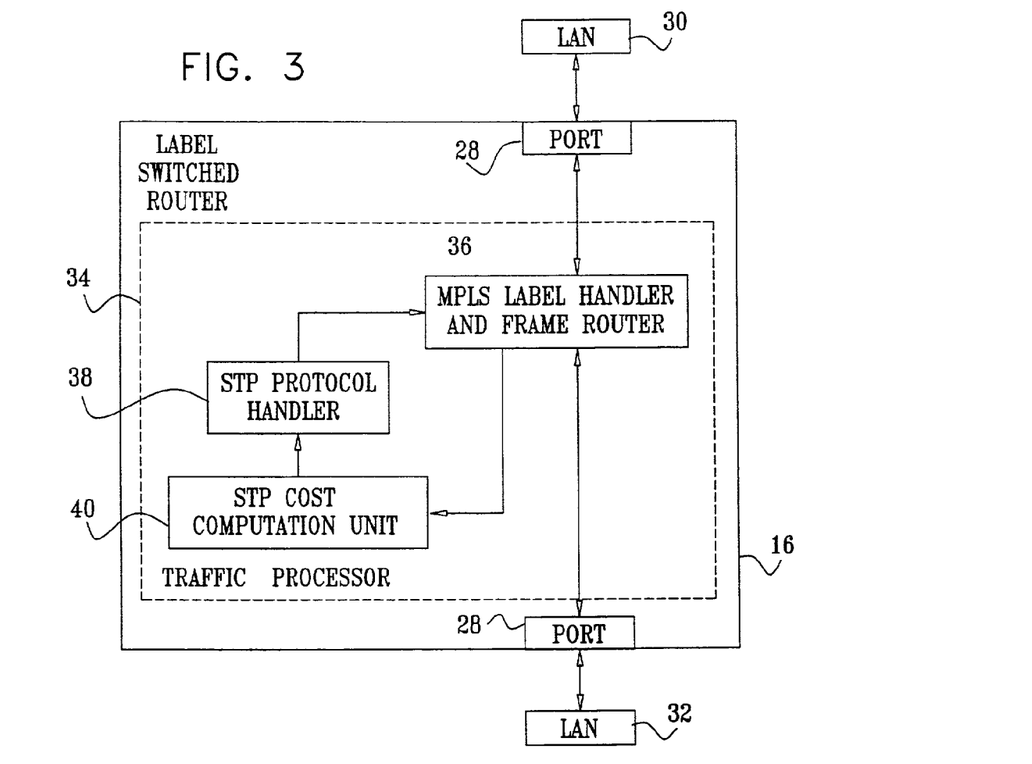
FIG. 3 is a block diagram that schematically illustrates functional elements of a label switching router (LSR), in accordance with a preferred embodiment of the present invention.

FIG. 3 is a block diagram that schematically illustrates functional elements of the nodes in system 10 (for example, of node 16), in accordance with a preferred embodiment of the present invention. Node 16 uses ports 28 to connect to its adjoining segments 30 and 32 in network 10. MPLS traffic in network 10 is handled by a traffic processor 34, using a MPLS label handler and frame router 36 to route frame traffic between the ports, as is known in the art. Although traffic processor 34 is shown in FIG. 3 as comprising a number of different functional blocks, these blocks are typically implemented as software processes on a common central processing unit (CPU) in node 16. Alternatively, some or all of these blocks may be implemented as separate hardware elements. Only those elements of node 16 that are essential to an understanding of the present invention (mainly those that are relevant to the operation of the node as a LSR) are shown in FIG. 3. The remaining blocks that must be added to the LSR will be apparent to those skilled in the art.

At network startup, and at intervals determined by the spanning tree protocol (STP), traffic processor 34 initiates a STP process to eliminate loops in the TLS in network 10. For this purpose, the traffic processor invokes a STP protocol handler component 38, as described in the above-mentioned IEEE 802.1D standard. STP protocol handler 38 in turn depends on a STP cost computation unit 40 to determine port and path costs for a given connection between node 16 and other LSRs in the network, as well as between node 16 and the designated root LSR. The port and path costs in this case do not relate directly to segments 30 and 32, but rather to the virtual paths and virtual ports used in the TLS.

Figure 4:
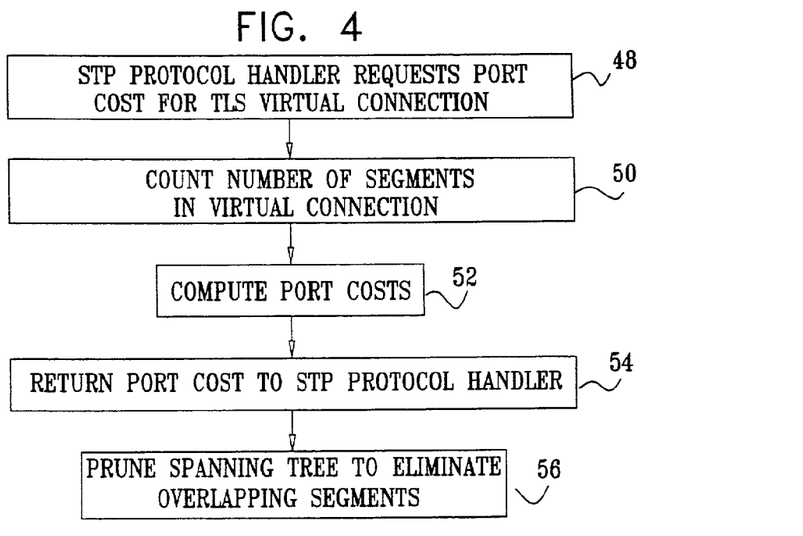
FIG. 4 is a flow chart that schematically illustrates a method for pruning a spanning tree in a network of virtual connections, in accordance with a preferred embodiment of the present invention.

FIG. 4 is a flow chart that schematically illustrates a method for pruning the spanning tree of virtual connections in a TLS, in accordance with a preferred embodiment of the present invention. Before running STP, protocol handler 38 requests the cost for each TLS connection of node 16, at a cost request step 48. STP cost computation unit 40 counts the number of actual segments in each virtual connection, at a segment count step 50. Suitable methods for this sort of segment counting are known in the art, as provided, for example, by the RPR protocol.

At a computation step 52, the cost computation unit determines the port costs, based on the segment counts, in such a way as to favor simple (non-overlapping) paths. For a virtual connection between a pair of nodes in the TLS, the port cost is preferably computed as follows:

$$\text{Port Cost} = K^*(\text{number of segments between nodes}) - N,$$

wherein K and N are constants. Subtraction of the constant N (which is preferably set equal to one) in the port cost computation differs from methods of cost computation known in the art and, in this embodiment, is the key to reducing the path cost of simple paths relative to overlapping paths. The port cost is returned to STP protocol handler 38, at a return cost step 54.

The STP protocol handler is now ready to run STP and to prune the TLS spanning tree accordingly, at a pruning step 56. For this purpose, the protocol handler exchanges BPDUs with the other nodes in the TLS, preferably using the methods for encapsulating and transmitting the BPDUs over the LSPs that are described in the above-mentioned provisional patent application. Alternatively, other methods known in the art may be used for this purpose. To choose the paths to be pruned, the protocol handler computes the root path cost for each path. As defined in the Background of the Invention, this cost is the sum of the port costs for a set of connections leading to the root node. Based on the formula above, the root path cost is given by:

$$\text{Root Path Cost} = K^*(\text{number of segments between node and root}) - N^*(\text{number of virtual bridges on the path}).$$

In other words, for each additional segment that the path traverses, there is a deduction (−N) from the path cost. Therefore, if multiple root paths traverse the same segments in the TLS, the path that contains the most node-to-node virtual connections will have the lowest cost and will therefore be selected at step 56. The deduction from the path cost encourages STP to favor paths that are formed by extending other, shorter paths.

Returning to network 10 in FIGS. 1, 2A and 2B, Table I below details the port costs for each of the three LSPs in the network, while Table II details the root path costs from each node in the network to the designated root node (node 12), wherein K is set to 20, and N is set to 1. (Of course, other constants and other deduction factors may also be used.)

TABLE I

PORT COSTS

| LSP | Number of Segments | Cost |
| --- | --- | --- |
| 22 | 1 | 20 * 1 − 1 = 19 |
| 24 | 1 | 20 * 1 − 1 = 19 |
| 26 | 2 | 20 * 2 − 1 = 39 |

TABLE II

ROOT PATH COSTS OF LSR 16

| Via LSP | Number of Segments | Number of Bridges | Cost |
| --- | --- | --- | --- |
| 22–24 | 2 | 2 | 38 |
| 26 | 2 | 1 | 39 |

Since the root path cost of node 16 via LSPs 22 and 24 is lower than the root path cost via LSP 26, STP protocol handler 38 of node 16 will set the virtual port connected to LSP 26 to the blocked state, and will forward traffic through the virtual port connected to LSP 24.

Although for the sake of simplicity, the description above relates only to a single ring, the methods used here can be extended in a straightforward way to networks made up of multiple rings. In such networks, the avoidance of overlap between virtual paths is preferably limited to paths within each of the rings. Therefore, when a LSP passes through an interconnection node, which interconnects a ring with another ring or other network, the port costs are preferably computed at step 52 based only on the number of segments between the interconnection node (rather than the root node) and the other nodes within the same ring.

Furthermore, although the preferred embodiment depicted above is based implicitly on MPLS tunnels, the methods described herein may similarly be applied to other tunnel technologies (such as the Layer Two Tunneling Protocol [L2TP] or MPLS over IP), as well as to encapsulated bridge technologies. In bidirectional networks, such as RPR networks (described in the Background of the Invention), it is also necessary to select the traffic direction to use for the virtual connection between any pair of nodes. The source node sending a packet within a ring adds the RPR destination and source addresses, in addition to a tag identifying the virtual path. If the packet needs to be transferred between rings, the interconnecting node changes the addresses in the packet header based on the destination node and source node (i.e., the interconnecting node) in the target ring. In terms of STP, however, the methods used for avoiding overlapping segments and for pruning the spanning tree to favor simple paths in bidirectional rings are substantially the same as those described above.

Whereas preferred embodiments are described herein with reference to TLS and STP in ring networks, the principles of the present invention may similarly be applied to optimizing topologies of virtual or tunneled connections in networks of other types, and using other path pruning algorithms. It will thus be appreciated that the preferred embodiment described above is cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for eliminating loops in a communication network, which includes nodes mutually connected by network segments, the method comprising:

configuring the nodes to operate as virtual bridges, having virtual ports that link the virtual bridges one to another over respective virtual connections, each of the virtual connections coinciding respectively with one or more of the network segments, and at least one of the virtual connections coinciding respectively with two or more of the network segments, which are linked in series via at least one intermediate node;

assigning to the virtual ports respective port costs that are responsive to a count of the network segments with which the respective virtual connections coincide, so as to favor virtual paths between pairs of the nodes that are made up of a greater number of the virtual connections, relative to the virtual paths that are made up of a lesser number of the virtual connections;

computing respective path costs for the virtual paths, based on the port costs; and selecting the virtual connections over which to send traffic between the virtual bridges responsive to the path costs.

2. The method according to claim 1, wherein the nodes and segments are configured in a ring topology.

3. The method according to claim 2, wherein selecting the virtual connections comprises selecting the virtual connections so that the virtual connections over which the traffic is sent define simple paths conforming to the ring topology.

4. The method according to claim 1, wherein selecting the virtual connections comprises blocking one or more of the virtual connections so that for each of the network segments, there is only a single one of the virtual connections coinciding with it over which the traffic is sent.

5. The method according to claim 4, wherein blocking the one or more of the virtual connections comprises, when a first virtual connection between a first virtual bridge and a second virtual bridge overlaps a sequence of two or more virtual connections between the first virtual bridge, one or more intermediate virtual bridges, and the second virtual bridge, blocking the first virtual connection.

6. The method according to claim 1, wherein configuring the nodes comprises configuring the virtual bridges to convey the traffic therebetween using a label-switching protocol.

7. The method according to claim 6, wherein configuring the virtual bridges comprises arranging the virtual bridges to provide a transparent local area network service (TLS) using the label-switching protocol.

8. The method according to claim 7, wherein selecting the virtual connections comprises running a spanning tree protocol (STP) on the TLS.

9. The method according to claim 1, wherein assigning the respective port costs comprises setting each of the port costs equal to a first constant times the count of the network segments with which the respective virtual connections coincide, less a second constant.

10. The method according to claim 9, wherein computing the respective path costs comprises summing the port costs of the virtual connections making up the virtual paths, so that each of the path costs is equal to the first constant times the count of the network segments with which the respective virtual connections making up the virtual paths coincide, less the second constant times the number of the virtual connections making up the virtual paths.

11. A method for eliminating overlap in a communication network, which includes nodes mutually connected by network segments, the method comprising:

configuring the nodes to operate as virtual bridges having virtual ports that link the virtual bridges one to another over respective virtual connections, each of the virtual connections coinciding respectively with one or more of the network segments;

assigning to the virtual ports respective port costs that are responsive to a count of the network segments with which the respective virtual connections coincide, so as to favor virtual paths between pairs of the nodes that are made up of a greater number of the virtual connections, relative to the virtual paths that are made up of a lesser number of the virtual connections; and selecting the virtual connections over which to send traffic between the virtual, bridges responsively to the respective port costs such that when a first virtual connection between a first virtual bridge and a second virtual bridge overlaps a sequence of two or more other virtual connections between the first virtual bridge, one or more intermediate virtual bridges, and the second virtual bridge, the first virtual connection is blocked, and the traffic is sent over the sequence of virtual connections.

12. The method according to claim 11, wherein the nodes and segments are configured in a ring topology.

13. The method according to claim 12, wherein selecting the virtual connections comprises selecting the virtual connections so that the virtual connections over which the traffic is sent define simple paths conforming to the ring topology.

14. The method according to claim 11, wherein selecting the virtual connections comprises blocking at least the first virtual connection so that for each of the network segments, there is only a single one of the virtual connections coinciding with it over which the traffic is sent.

15. The method according to claim 11, wherein configuring the nodes comprises configuring the virtual bridges to convey the traffic therebetween using a label-switching protocol.

16. The method according to claim 15, wherein configuring the virtual bridges comprises arranging the virtual bridges to provide a transparent local area network service (TLS) using the label-switching protocol.

17. The method according to claim 16, wherein selecting the virtual connections comprises running a spanning tree protocol (STP) on the TLS.

18. A device for operation as one of a plurality of nodes in a communication network, in which the nodes are mutually connected by network segments, the device comprising:
one or more ports, operative to send and receive traffic through the communication network; and
a traffic processor, configured to process the traffic so that the device operates as a virtual bridge, having virtual ports that link the device to other virtual bridges in the network over respective virtual connections, each of the virtual connections coinciding respectively with one or more of the network segments, and at least one of the virtual connections coinciding respectively with two or more of the network segments, which are linked in series via at least one intermediate node,
wherein the traffic processor is operative to assign to the virtual ports respective port costs that are responsive to a count of the network segments with which the respective virtual connections coincide, so as to favor virtual paths between pairs of the nodes that are made up of a greater number of the virtual connections, relative to the virtual paths that are made up of a lesser number of the virtual connections, to compute respective path costs for the virtual paths, based on the port costs, and to select the virtual connections over which to send the traffic between the virtual bridges responsive to the path costs.

19. The device according to claim 18, wherein the nodes and segments are configured in a ring topology.

20. The device according to claim 19, wherein the traffic processor is operative to select the virtual connections so that the virtual connections over which the traffic is sent define simple paths conforming to the ring topology.

21. The device according to claim 18, wherein the traffic processor is operative to block one or more of the virtual connections so that for each of the network segments, there is only a single one of the virtual connections coinciding with it over which the traffic is sent.

22. The device according to claim 21, wherein the traffic adapter is operative to block the one or more of the virtual connections such that, when a first virtual connection between a first virtual bridge and a second virtual bridge overlaps a sequence of two or more virtual connections between the first virtual bridge, one or more intermediate virtual bridges, and the second virtual bridge, the first virtual connection is blocked.

23. The device according to claim 18, wherein the traffic processor is operative to convey the traffic through the ports using a label-switching protocol.

24. The device according to claim 23, wherein the virtual bridges are arranged to provide a transparent local area network service (TLS) using the label-switching protocol.

25. The device according to claim 24, wherein the traffic processor is operative to select the virtual connections by running a spanning tree protocol (STP) on the TLS.

26. The device according to claim 18, wherein the traffic processor is operative to set each of the port costs equal to a first constant times the count of the network segments with which the respective virtual connections coincide, less a second constant.

27. The device according to claim 26, wherein the traffic processor is operative to compute the respective path costs by summing the port costs of the virtual connections making up the virtual paths, so that each of the path costs is equal to the first constant times the count of the network segments with which the respective virtual connections making up the virtual paths coincide, less the second constant times the number of the virtual connections making up the virtual paths.

28. A device for operation as one of a plurality of nodes in a communication network, in which the nodes are mutually connected by network segments, the device comprising:
one or more ports, operative to send and receive traffic through the communication network; and
a traffic processor, configured to process the traffic so that the device operates as a virtual bridge, having virtual ports that link the device to other virtual bridges in the network over respective virtual connections, each of the virtual connections coinciding respectively with one or more of the network segments,
wherein the traffic processor is operative to assign to the virtual ports respective port costs that are responsive to a count of the network segments with which the respective virtual connections coincide, so as to favor virtual paths between pairs of the nodes that are made up of a greater number of the virtual connections, relative to the virtual paths that are made up of a lesser number of the virtual connections, and to select the virtual connections over which to send traffic between the virtual bridges responsively to the respective port costs such that when a first virtual connection between a first virtual bridge and a second virtual bridge overlaps a sequence of two or more other virtual connections between the first virtual bridge, one or more intermediate virtual bridges, and the second virtual bridge, the first virtual connection is blocked, and the traffic is sent over the sequence of virtual connections.

29. The device according to claim 28, wherein the nodes and segments are configured in a ring topology.

30. The device according to claim 29, wherein the traffic processor is operative to select the virtual connections so that the virtual connections over which the traffic is sent define simple paths conforming to the ring topology.

31. The device according to claim 28, wherein the traffic processor is operative to block at least the first virtual connection so that for each of the network segments, there is only a single one of the virtual connections coinciding with it over which the traffic is sent.

32. The device according to claim 28, wherein the traffic processor is operative to convey the traffic through the ports using a label-switching protocol.

33. The device according to claim 32, wherein the virtual bridges are arranged to provide a transparent local area network service (TLS) using the label-switching protocol.

34. The device according to claim 33, wherein the traffic processor is operative to select the virtual connections by running a spanning tree protocol (STP) on the TLS.

35. A communication network comprising a plurality of nodes and network segments connecting the nodes in a ring topology,
- wherein the nodes are operative to send and receive traffic over the segments and to process the traffic so as to operate as virtual bridges, having virtual ports that link each of the nodes to other virtual bridges in the network over respective virtual connections, each of the virtual connections coinciding respectively with one or more of the network segments, and at least one of the virtual connections coinciding respectively with two or more of the network segments, which are linked in series via at least one intermediate node, and
- wherein the nodes are further operative to assign to the virtual ports respective port costs that are responsive to a count of the network segments with which the respective virtual connections coincide, so as to favor virtual paths between pairs of the nodes that are made up of a greater number of the vittual connections, relative to the virtual paths that are made up of a lesser number of the virtual connections, and to compute respective path costs for the virtual paths, based on the port costs, and to select the virtual connections over which to send the traffic between the virtual bridges responsive to the path costs.

36. A communication network comprising a plurality of nodes and network segments connecting the nodes in a ring topology,
- wherein the nodes are operative to send and receive traffic over the segments and to process the traffic so as to operate as virtual bridges, having virtual ports that link each of the nodes to other virtual bridges in the network over respective virtual connections, each of the virtual connections coinciding respectively with one or more of the network segments, and
- wherein the nodes are further operative to assign to the virtual ports respective port costs that are responsive to a count of the network segments with which the respective virtual connections coincide, so as to favor virtual paths between pairs of the nodes that are made up of a greater number of the virtual connections, relative to the virtual paths that are made up of a lesser number of the virtual connections, and to select the virtual connections over which to send traffic between the virtual bridges responsively to the respective port costs such that when a first virtual connection between a first virtual bridge and a second virtual bridge overlaps a sequence of two or more other virtual connections between the first virtual bridge, one or more intermediate virtual bridges, and the second virtual bridge, the first virtual connection is blocked, and the traffic is sent over the sequence of virtual connections.

* * * * *